United States Patent [19]
Kim

[11] Patent Number: 6,128,719
[45] Date of Patent: Oct. 3, 2000

[54] INDIRECT ROTATOR GRAPH NETWORK

[75] Inventor: Seong-dong Kim, Suwon, Rep. of Korea

[73] Assignee: SamSung Electronics Co., Ltd., Suwon, Rep. of Korea

[21] Appl. No.: 09/157,584

[22] Filed: Sep. 21, 1998

[30] Foreign Application Priority Data

Sep. 19, 1997 [KE] Kenya ................................ 97-47794

[51] Int. Cl.$^7$ ................................................ G06F 15/00
[52] U.S. Cl. ........................ 712/12; 712/16; 712/11; 709/200; 709/243
[58] Field of Search ............................... 712/12, 11, 16, 712/15, 13, 14; 710/132; 709/200, 243

[56] References Cited

U.S. PATENT DOCUMENTS

| | | | |
|---|---|---|---|
| 3,794,983 | 2/1974 | Sahin | 382/206 |
| 4,434,463 | 2/1984 | Quinquis et al. | 709/253 |
| 4,858,147 | 8/1989 | Conwell | 706/19 |
| 5,125,076 | 6/1992 | Faber et al. | 709/245 |
| 5,133,073 | 7/1992 | Jackson et al. | 712/12 |
| 5,170,482 | 12/1992 | Shu et al. | 712/12 |
| 5,212,773 | 5/1993 | Hillis | 712/15 |
| 5,574,931 | 11/1996 | Letellier et al. | 712/11 |
| 5,669,008 | 9/1997 | Galles et al. | 712/12 |
| 5,682,544 | 10/1997 | Pechanek et al. | 138/99 |
| 5,689,661 | 11/1997 | Hayashi et al. | 710/131 |
| 5,715,391 | 2/1998 | Jackson et al. | 712/11 |
| 5,737,628 | 4/1998 | Birrittella et al. | 712/11 |
| 5,859,981 | 1/1999 | Levin et al. | 395/200.68 |

*Primary Examiner*—Meng-Ai T. An
*Assistant Examiner*—Mackly Monestime
*Attorney, Agent, or Firm*—Robert E. Bushnell, Esq.

[57] ABSTRACT

An interconnection network used for a multiprocessor system. An indirect n-dimensional rotator graph network having a transmission path of arbitrary nodes in a multiprocessor system including n! nodes includes n! input ports, n! output ports, a first stage switch module including n! demultiplexers, second through (n−1)th stage switch modules each having n! n×n crossbar switches, and an nth stage switch module including n! multiplexers, in which the switches or the demultiplexers composing switch modules of first to (n−1)th stages comprise n generators $g_1, g_2, \ldots, g_n$, the $g_1$ is connected to a switch or multiplexer of a later stage having an identifier identical to that of a demultiplexer or switch, to which the $g_1$ is included, and the $g_i (2 \leq i \leq n)$ is connected to a switch or multiplexer of a later stage having an identifier identical to the identifier obtained by rotating the first (n−i+2) symbols of the identifier of the switch or the demultiplexer to which the $g_i$ is included to the left. Accordingly, when the number of nodes is equal in indirect networks, a network according to the present invention, may have the transmission stage shorter than other networks. Thus, the tag required for routing is reduced, to thereby increase a message transmission efficiency rate.

14 Claims, 4 Drawing Sheets

40

INDIRECT ROTATOR GRAPH NETWORK

CLAIM OF PRIORITY

This application makes reference to, incorporates the same herein, and claims all benefits accruing under 35 U.S.C. § 119 from an application entitled *Indirect Rotator Graph Network* earlier filed in the Korean Industrial Property Office on the 19th day of September 1997, and there duly assigned Serial No. 97-47794, a copy of which is annexed hereto.

BACKGROUND OF THE INVENTION

1. Technical Field

The present invention relates to an interconnection network in a multiprocessor system, and more particularly to an interconnection network in a multiprocessor system utilizing an indirect rotator graph connection method.

2. Related Art

In general, a multiprocessor system includes two or more processors and a communication path for transmitting data between the processors. A memory management and an interconnection network are very important for designing the multiprocessor system. Here, the interconnection network should be designed such that a parallel processing overhead induced by a multiplicity of processors is minimized.

Several variations on multi-degree topologies pertaining to interconnections of multiple processors have been proposed to reduce the longest path between processors and the number of interconnections between processors in order to improve performance and to allow the number of processors to grow larger. These proposals for interconnection topologies of multiple processors are typically shown in the form of a graph in which nodes represent switching points or processing elements and edges represent communication links. Since the topologies tend to be regular, the descriptions lend themselves to graphical displays representing systems. Those skilled in the art readily recognize the conversion of graphical representations of system topologies into hardware. Hence, this shorthand notation is a convenient method of representing larger and more complex hardware multiple-processor systems without the associated complexity of unnecessary details.

Exemplars of recent efforts in the art include U.S. Pat. No. 5,125,076 for a *System for Routing Messages in a Vertex Symmetric Network by Using Addresses Formed from Permutations of the Transmission Line Indicees* issued to Faber et al., U.S. Pat. No. 4,434,463 for a *Multiprocessor Topology with Plural Bases for Directly and Indirectly Coupling Addresses and Relay Stations* issued to Quinquis et al., U.S. Pat. No. 5,715,391 for a *Modular and Infinity Extendable Three Dimensional Torus Packaging Scheme for Parallel Processing* issued to Jackson et al., U.S. Pat. No. 5,689,661 for a *Reconfigurable Torus Network Having Switches Between All Adjacent Processor Elements For Statically or Dynamically Splitting The Network Into a Plurality of Subsystems* issued to Hayashi et al., U.S. Pat. No. 5,133,073 a *Processor Array of N-dimensions Which Is Physically Reconfigurable into N−1 or Fewer Dimensions* for issued to Jackson et al., U.S. Pat. No. 5,692,544 for a *Massively Parallel Diagonal-fold Tree Array Processor* issued to Pechanek et al., U.S. Pat. No. 5,212,773 for a *Wormhole Communications Arrangement For Massively Parallel Processor* issued to Hillis, U.S. Pat. No. 5,669,008 for a *Hierarchical Fat Hypercube Architecture for Parallel Processing Systems* issued to Galles et al, U.S. Pat. No. 5,737,628 for a *Multiprocessor Computer System with Interleaved Processing Element Nodes* issued to Birrittella et al., and U.S. Pat. No. 5,170,482 for an *Improved Hypercube Topology for Multiprocessor Computer Systems* issued to Shu et al.

While these recent efforts provide advantages, I note that they fail to adequately satisfy a need for an enhanced interconnection network in a multiprocessor system.

SUMMARY OF THE INVENTION

To solve the above problems, it is an object of the present invention to provide an indirect rotator graph network (IRGN). This indirect rotator graph network (IRGN) is a dynamic network that has characteristics of a rotator graph, a static network, and a direct method.

It is another object of the present invention to provide a setting method of a transmission path between a transmission node and a receiving node in the indirect rotator graph network (IRGN).

Accordingly, to achieve the above object and others of the present invention, there is provided an indirect n-dimensional rotator graph network having a transmission path of arbitrary nodes in a multiprocessor system including n! nodes having one of $r_1 r_2 \ldots r_n$, where $r_i$ indicates n different symbols, $1 \leq i \leq n$, as an identifier, comprising: n! input ports connected to the nodes, respectively; n! output ports connected to the nodes, respectively; a first stage switch module connected to the nodes through the input ports, including n! demultiplexers each having an identifier equivalent to that of the connected node; second through (n−1)th stage switch modules each having n! n×n crossbar switches each having one of n! $r_1 r_2 \ldots r_n$ as an identifier, respectively; and an nth stage switch module connected to the nodes through the output ports, including n! multiplexers each having an identifier equivalent to that of the connected node, in which the switches or the demultiplexers composing switch modules of first to (n−1)th stages comprise n generators $g_1, g_2, \ldots, g_n$, the $g_1$ is connected to a switch or multiplexer of a later stage having an identifier identical to that of a demultiplexer or switch, to which the $g_1$ is included, and the $g_i$, such that $2 \leq i \leq n$, is connected to a switch or multiplexer of a later stage having an identifier identical to the identifier obtained by rotating the first (n−i+2) symbols of the identifier of the switch or the demultiplexer to which the $g_i$ is included to the left.

To achieve the second object of the present invention, there is provided a setting method of a transmission path in an indirect n-dimensional rotator graph network connected to n! nodes each having one of n! $r_1 r_2 \ldots r_n$ as an identifier, where $r_i$ indicates n symbols, such that $1 \leq i \leq n$, comprising: a first step of mapping n new symbols having code values an ascending order to symbols composing the identifier of a receiving node one by one; a second step of renaming each symbol composing an identifier of a transmission node to a new symbol mapped in the same manner as the step of mapping the receiving node identifier; a third step of sequentially rotating the first (n−1) symbols of the renamed transmission node identifier to the left; a fourth step of sorting two last symbols of the rotated transmission node identifier in an ascending order; a fifth step of determining a transmission path by mapping the new symbols composing the sorted transmission node symbol in the manner inverse to that of the first step; and a sixth step of repeating the third to fifth steps by reducing one of the number the symbols rotated in the third step, and increasing one of the number the symbols sorted in the fourth step until all new symbols composing the transmission node are sorted in the ascending order.

To achieve these and other objects in accordance with the principles of the present invention, as embodied and broadly described, the present invention provides a communication apparatus enabling data transfer among n! nodes in a multiprocessor system, comprising: a plurality of processor units; n! network nodes coupling said plurality of processor units, wherein said n is a positive whole integer, said n! network nodes forming an n-dimensional network configuration enabling data transfers among said plurality of processor units along a path connecting a plurality of transmission nodes selected from among said n! network nodes, each respective one of said n! network nodes having a respective unique network node label selected from n! unique network node labels; n! input ports being connected to said n! network nodes; n! output ports being connected to said n! network nodes; a first stage switch unit including n! demultiplexer units being coupled with said n! input ports, and said first stage switch unit corresponding to a first stage; a last stage switch unit including n! multiplexer units being coupled with said n! output ports, and said last stage switch unit corresponding to a last stage after said first stage; a plurality of intermediate stage switch units each including n! n*n crossbar switchers and being disposed between said first and last stage switch unit, said plurality of intermediate stage switch units corresponding to second stage through (n−1)th stage switch units, said plurality of intermediate stage switch units corresponding to a plurality of intermediate stages later than said first stage, wherein a first intermediate stage is later than said first stage and a second intermediate stage is later than said first intermediate stage, said first and second intermediate stages being included in said plurality of intermediate stages; a plurality of n output generator units being included within each one of said n! n*n crossbar switchers and being included within each one of said n! demultiplexer units, wherein each one unit of said plurality of n output generator units is coupled with one selected from among said n! n*n crossbar switchers and said n! multiplexer units in a later stage.

To achieve these and other objects in accordance with the principles of the present invention, as embodied and broadly described, the present invention provides a communication apparatus enabling data transfer among n! nodes in a multiprocessor system, comprising: a plurality of processor units; a plurality of n! network nodes coupling said plurality of processor units, wherein said n is a positive whole integer, said plurality of n! network nodes forming an n-dimensional network configuration enabling data transfers among said plurality of processor units along a path connecting a plurality of transmission nodes selected from among said plurality of n! network nodes, each respective one of said plurality of n! network nodes having a respective unique network node label selected from a plurality of n! unique network node labels; a plurality of n! input ports being connected to said plurality of n! network nodes; a plurality of n! output ports being connected to said plurality of n! network nodes; a first stage switch unit being disposed between said plurality of n! network nodes and said plurality of n! input ports, said first stage switch unit corresponding to a first stage; a plurality of n! demultiplexer units being included within said first stage switch unit and being coupled with said plurality of n! network nodes; a last stage switch unit being disposed between said plurality of n! network nodes and said plurality of n! output ports, said last stage switch unit corresponding to an nth stage switch unit, and said last stage switch unit corresponding to a last stage after said first stage; a first plurality of multiplexer units included within said last stage switch unit and being coupled with said plurality of n! network nodes, said first plurality of multiplexer units corresponding to n! multiplexer units; a plurality of intermediate stage switch units being disposed between said first and last stage switch units, said plurality of intermediate stage switch units corresponding to second through (n−1)th stage switch units, said plurality of intermediate stage switch units corresponding to a plurality of intermediate stages later than said first stage, wherein a first intermediate stage is later than said first stage and a second intermediate stage is later than said first intermediate stage, said first and second intermediate stages being included in said plurality of intermediate stages; a first plurality of crossbar switch units being included within each one of said plurality of intermediate stage switch units, each one of said first plurality of crossbar switch units corresponding to an n×n crossbar switcher, said first plurality of crossbar switch units corresponding to n! crossbar switch units; and a plurality of n output generator units being included within each one of said first plurality of crossbar switch units and being included within each one of said plurality of n! demultiplexer units, wherein each one unit of said plurality of n output generator units is coupled with one group in a later stage selected from among a second plurality of crossbar switch units chosen from said first plurality of crossbar switch units and a second plurality of multiplexer units chosen from said first plurality of multiplexer units.

To achieve these and other objects in accordance with the principles of the present invention, as embodied and broadly described, the present invention provides a communication apparatus enabling data transfer among n! nodes in a multiprocessor system, comprising: a plurality of processor units; a plurality of n! network nodes coupling said plurality of processor units, wherein said n is a positive whole integer, said plurality of n! network nodes forming an n-dimensional network configuration enabling data transfers among said plurality of processor units along a path connecting a plurality of transmission nodes selected from among said plurality of n! network nodes, each respective one of said plurality of n! network nodes having a respective unique network node label selected from a plurality of n! unique network node labels; a plurality of n! input ports being connected to said plurality of n! network nodes; a plurality of n! output ports being connected to said plurality of n! network nodes; a first stage switch unit being disposed between said plurality of n! network nodes and said plurality of n! input ports, said first stage switch unit corresponding to a first stage; a last stage switch unit being disposed between said plurality of n! network nodes and said plurality of n! output ports, said last stage switch unit corresponding to an nth stage switch unit, and said last stage switch unit corresponding to a last stage after said first stage; and a plurality of intermediate stage switch units being disposed between said first and last stage switch units, said plurality of intermediate stage switch units corresponding to second through (n−1)th stage switch units, said plurality of intermediate stage switch units corresponding to a plurality of intermediate stages later than said first stage, wherein a first intermediate stage is later than said first stage and a second intermediate stage is later than said first intermediate stage, said first and second intermediate stages being included in said plurality of intermediate stages.

To achieve these and other objects in accordance with the principles of the present invention, as embodied and broadly described, the present invention provides a method of setting a data transfer path in a communication apparatus, comprising the steps of: identifying a transmitting node selected from among a plurality of n! network nodes in a communication apparatus, wherein said n is a positive whole integer; said plurality of n! network nodes coupling a plurality of processor units and forming an n-dimensional network configuration enabling data transfers among said plurality of processor units along a data transfer path coupling said transmitting node with a receiving node selected from among said plurality of n! network nodes, each respective node of said plurality of n! network nodes having a respective node label selected from a plurality of n! node labels, each one of said plurality of n! node labels having a plurality of n symbols; identifying a transmitting node label selected from among said plurality of n! node labels, said transmitting node label corresponding to said transmitting node, said transmitting node label having a first transmitting symbol located at a leftmost position of said transmitting node label, a last transmitting symbol located at a rightmost position of said transmitting node label and corresponding to an nth transmitting symbol, and an (n−1)th transmitting symbol adjacent to said nth transmitting symbol and located at a left side of said nth transmitting symbol; identifying said receiving node and identifying a receiving node label selected from among said plurality of n! node labels, said receiving node label corresponding to said receiving node, said receiving node label having a first receiving symbol located at a leftmost position of said receiving node label, a last receiving symbol located at a rightmost position of said receiving node label and corresponding to an nth receiving symbol, and an (n−1)th receiving symbol adjacent to said nth receiving symbol and located at a left side of said nth receiving symbol, said plurality of symbols included in said transmitting node label also being included in said receiving node label; mapping a respective numerical value to each respective symbol of said plurality of n symbols of said receiving node label to form a receiving number having a plurality of n sequentially ascending numerical values, said first receiving symbol being mapped to a first receiving value, said nth receiving symbol being mapped to an nth receiving value larger than said first receiving value, said (n−1)th receiving symbol being mapped to an (n−1)th receiving value, said (n−1)th receiving value being less than said nth receiving value, forming a mapping relationship between said first receiving symbol and said first receiving value, between said nth receiving symbol and said nth receiving value, and between said (n−1)th receiving symbol and said (n−1)th receiving value; utilizing said mapping relationship formed between said plurality of receiving symbols and said plurality of receiving values to assign a respective numerical value to each respective symbol of said plurality of n symbols of said transmitting node label to form a transmitting number having a plurality of n numerical transmitting values; rotating in a left direction a leftmost (n−1) numerical transmitting values of said transmitting number to form a rotated transmitting number, said leftmost (n−1) numerical transmitting values corresponding to a total number of numerical transmitting values being rotated; sorting in an ascending order two rightmost numerical transmitting values of said rotated transmitting number to form a sorted rotated transmitting number, said two rightmost numerical transmitting values corresponding to a total number of numerical transmitting values being sorted; determining a data transfer path and utilizing said mapping relationship formed between said plurality of receiving symbols and said plurality of receiving values to perform a reverse-mapping and thereby assign a respective transmitting symbol to each respective numerical transmitting value of said plurality of n numerical transmitting values of said sorted rotated transmitting number; and sequentially repeating said rotating, sorting, and determining steps until all numerical transmitting values of said transmitting number are sorted in an ascending order from leftmost position to rightmost position of said transmitting number, such that one numerical transmitting value is removed from said total number of numerical transmitting values rotated in said rotating step prior to each performance of said rotating step, and such that one numerical transmitting value is added to said total number of numerical transmitting values sorted in said sorting step prior to each performance of said sorting step.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DESCRIPTION OF THE PREFERRED EMBODIMENT

Figure 1A:
FIG. 1A is a two-dimensional star graph.

In a multiprocessor system, the interconnection network supplies a message transmission path between an arbitrary processor and another processor, or a means for connecting the arbitrary processor to shared memories or shared I/O devices. In designing the network, a static network by a direct method or a dynamic network by an indirect method must be selected.

The static network shall be described first. In the static network in which an arbitrary processor of the multiprocessor system is directly connected to another processor thereof, the connection of the processors forming the multiprocessor system is fixed in the predetermined form when the program is performed. A linear array, a ring, a chordal ting, a tree, a fat tree, a star, a mesh, a torus, a systolic array and a hypercube are included to the above-type network.

Next the dynamic network shall be described. The dynamic network includes a multiplicity of switch channels capable of dynamically changing the connection when communication with other processors is required. A bus, a multiple bus, a crossbar and a multistage interconnection network are included in the above-type network.

The interconnection network determines characteristics of the multiprocessor system, such as performance, scalability and fault tolerance. In design of the multiprocessor system, as very large scale integration (VLSI) technologies are developed, complicated interconnection networks instead of simple interconnection networks such as linear array, ring and two-dimensional array have been developed. Here, the hypercube having characteristics of scalability exponentially increasing the number of nodes, short network diameter, symmetry, high fault tolerance and embedding other networks is most typical.

The star graph is a Cayley type graph and an undirected graph replaceable with the hypercube. In the star graph, 'd' is a Vertex degree indicating the number of links connected to each node and a network diameter indicating the number of links of a path between two nodes being farthest away increase in proportion to a network size more slowly than in the hypercube method. The star graph has also high fault tolerance and symmetry.

The rotator graph is a directed graph, and replaceable with the star graph. When the number of nodes is equivalent, the rotator graph has a network diameter shorter than that of the star graph, however, has regularity, symmetry and scalability which are shown in the star graph or the hypercube. However, in the star graph or the rotator graph which is a static network by a direct method, a connection structure is fixed, so that a communication path cannot be variously changed such that communication time with respect to all communication patterns is appropriately maintained.

In the following paragraphs, the phrase "n! nodes" is used to denote n factorial nodes. The symbol n is an integer. The word "factorial" is a noun defined as the product of all the positive integers from 1 to n. Thus, 1! nodes equals 1 node, 2! nodes equals 2 nodes, 3! nodes equals 6 nodes, 4! nodes equals 24 nodes, and 5! nodes equals 120 nodes.

Figure 1B:
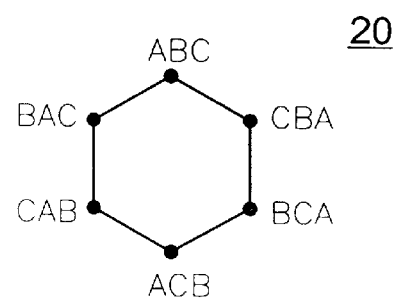
FIG. 1B is a three-dimensional star graph.
Figure 1C:
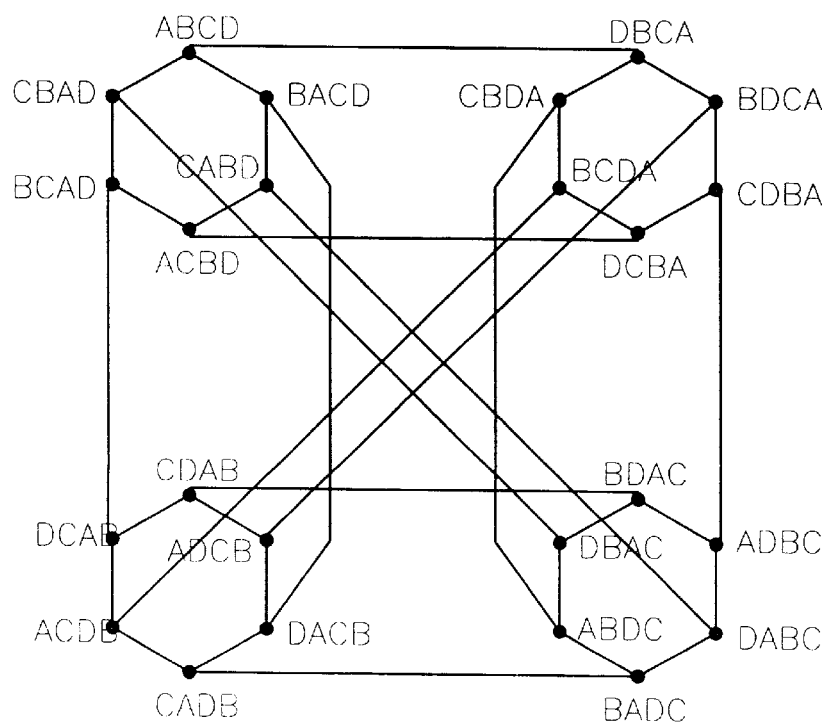
FIG. 1C is a four-dimensional star graph.

Refer now to FIGS. 1A, 1B, and 1C. FIG. 1A is a two-dimensional star graph, FIG. 1B is a three-dimensional star graph, and FIG. 1C is a four-dimensional star graph. The star graph is a Cayley type graph, and is an non-directed interconnection network replaceable with a hypercube. The two-dimensional star graph 10 of FIG. 1A has 2! nodes. Each of the 2 nodes is identified by 2 symbols. The three-dimensional star graph 20 of FIG. 1B has 3! nodes. Each of the 6 nodes is identified by 3 symbols. The four-dimensional star graph of FIG. 1C has 4! nodes. Each of the 24 nodes is identified by 4 symbols.

An n-dimensional star graph $S_n$ includes n! nodes, where each node is identified by an identifier indicated by $s_1 s_2 \ldots s_{i-1} s_i s_{i+1} \ldots s_n$, and where $s_i$ indicates n different symbols, such that $1 \leq i \leq n$. The node having the identifier indicated by $s_1 s_2 \ldots s_{i-1} s_i s_{i+1} \ldots s_n$ is directly connected to nodes each having an identifier indicated by $s_i s_2 \ldots s_{i-1} s_1 s_{i+1} \ldots s_n$, such that $2 \leq i \leq n$. Accordingly, each of the nodes includes a link for directly connecting to (n−1) nodes each having an identifier determined by changing a first symbol of the identifier of the node with i-th symbol thereof, where $2 \leq i \leq n$.

The $S_n$ star graph includes n $S_{n-1}$ star graphs, and thus the $S_{n-1}$ star graph is a subgraph of the $S_n$ star graph. For example, the number of nodes of the $S_3$ star graph is 3!=6, and the $S_3$ star graph includes three $S_2$ star graphs. Here, in the three-dimensional star graph $S_3$ of FIG. 1B, identifiers of each node are ABC, ACB, BAC, BCA, CAB, and CBA.

A rotator graph is a directional graph, and an n-dimensional rotator graph $R_n$ includes n! nodes, each of which is identified by an identifier indicated by $r_1 r_2 \ldots r_{i-1} r_i r_{i+1} \ldots r_n$, where $r_i$ indicates n different symbols, such that $1 \leq i \leq n$, and has directional links toward the nodes each having an identifier indicated by $r_2 \ldots r_1 r_{i+1} \ldots r_n$, such that $2 \leq i \leq n$. That is, each of the nodes has directional links toward (n−1) nodes each having an identifier determined by rotating the first i, such that $2 \leq i \leq n$, symbols forming an identifier of the node to the left.

The identifier indicated by $r_2 \ldots r_1 r_{i+1} \ldots r_n$ results from rotating the first i components to the left from the identifier indicated by $r_1 r_2 \ldots r_{i-1} r_i r_{i-1} \ldots r_n$. In a strict sense of the word, the identifier indicated by $r_2 \ldots r_1 r_{i+1} \ldots r_n$ can be expressed by $r_2 r_3 \ldots r_{i-1} r_i r_1 r_{i+1} \ldots r_n$.

Figure 2:
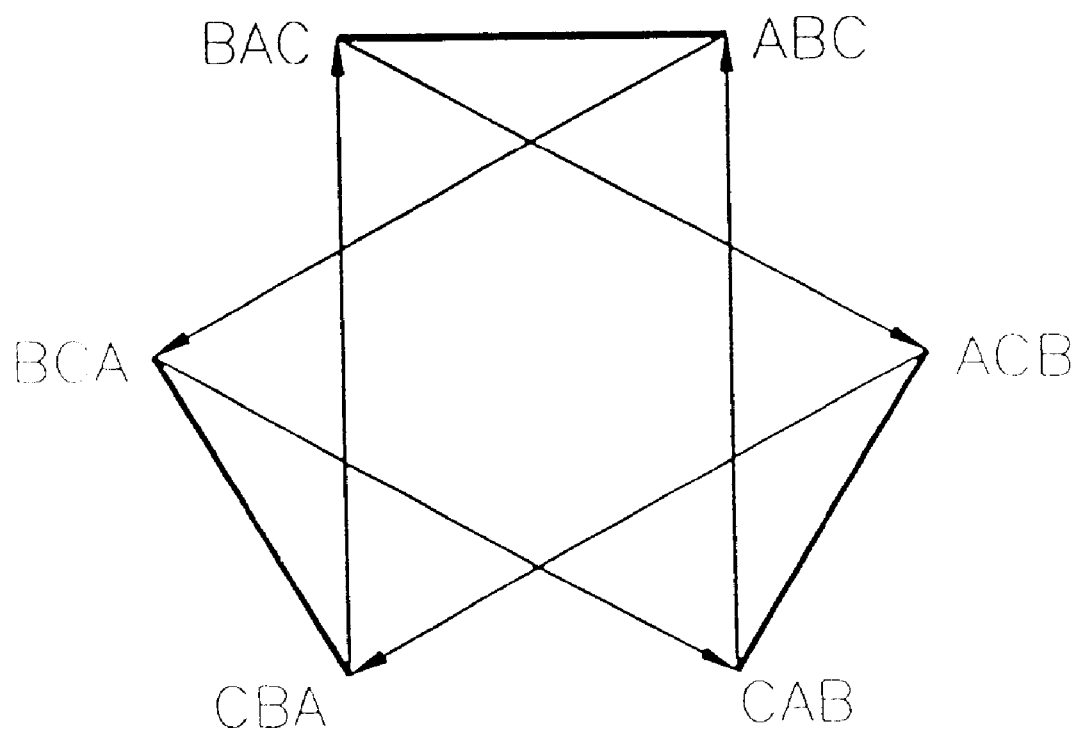
FIG. 2 is a three-dimensional rotator graph.

Accordingly, a bidirectional link is between two nodes in which positions of two initial symbols are exchanged. Refer now to FIG. 2, which is a three-dimensional rotator graph 40. In FIG. 2, a bidirectional link is indicated by each of the three thick lines. A first thick line connects BAC to ABC. A second thick line connects BCA to CBA. And a third thick line connects CAB to ACB. In FIG. 2, a directional link is indicated by each of the six thin lines. The thin lines are the remaining six lines shown.

Figure 3:
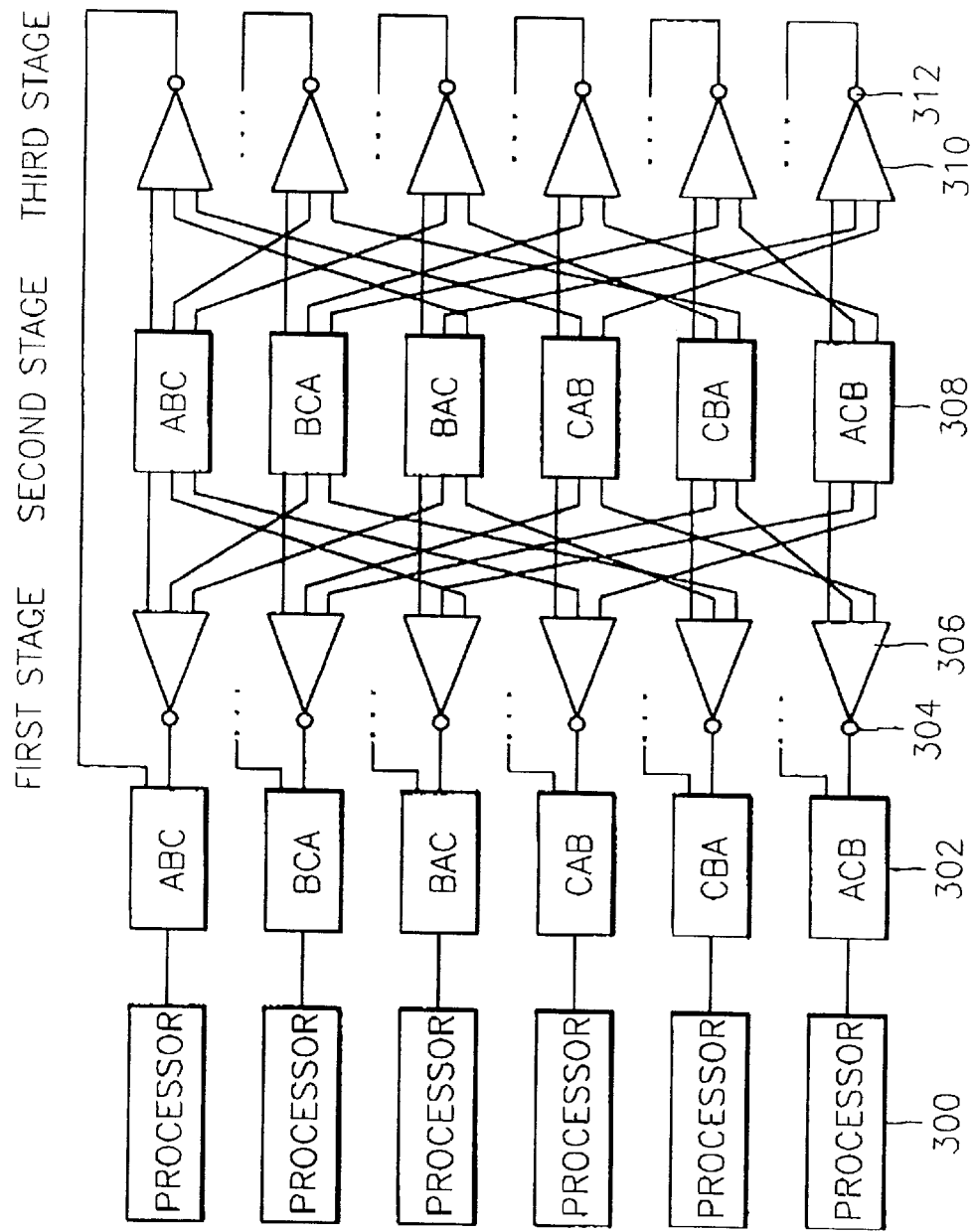
FIG. 3 shows an indirect three-dimensional rotator graph network, in accordance with the principles of the present invention.

Refer now to FIG. 3, which shows an indirect three-dimensional rotator graph network 50, in accordance with the principles of the present invention. Referring to FIG. 3, an indirect n-dimensional rotator graph network 50 has N input ports and N output ports, where 'N' indicates the number of overall nodes, that is, n!. In FIG. 3, n corresponds to 3, n! corresponds to 6, and N corresponds to 6.

The n! nodes are connected to input ports and output ports of the indirect n-dimensional rotator graph network 50. The first stage of the indirect n-dimensional rotator graph network 50 is coupled with n! input ports and the last stage of the indirect n-dimensional rotator graph network 50 is coupled with n! output ports. The remaining stages of the indirect n-dimensional rotator graph network 50 are linked to the previous stage and the next stage, not being connected to the nodes.

In FIG. 3, the indirect three-dimensional rotator graph network 50 includes a processor 300, a network node 302, an input port 304, a demultiplexer unit 306, a 3×3 crossbar switcher 308, a multiplexer unit 310, and an output unit 312.

When a diameter of a network of rotator graph is $K_n$, $K_n$ indicates (n−1), and indirect rotator graph network (IRGN) includes $(K_n+1)$ switch stages. A first stage switch module is connected to the nodes through the input ports, and includes n! demultiplexers each having an identifier identical to that of the connected node. The n stage switch module is connected to the nodes through the output ports, and includes n! multiplexers each having an identifier identical to that of the connected nodes. When the indirect rotator graph network (IRGN) is three- or more-dimensional, a switch module of another stage composed of (n×n) cross bars is required between the first stage switch module and the nth stage switch module.

The (n×n) cross bar switches, or the demultiplexers, comprising the first stage to (n−1)th stage switch modules have n output links, respectively. Each link is a generator called $g_1, g_2, \ldots, g_n$. The $g_1$ is connected to a switch or multiplexer of a later stage having an identifier identical to the identifier of a demultiplexer or a switch to which the $g_1$ is included. Also, the $g_i$ ($2 \leq i \leq n$) is connected to a switch or multiplexer of a later stage having an identifier identical to the identifier obtained by rotating the first (n−i+2) symbols of the identifier of the switch or the demultiplexer to which the $g_i$ is included to the left.

Figure 4:
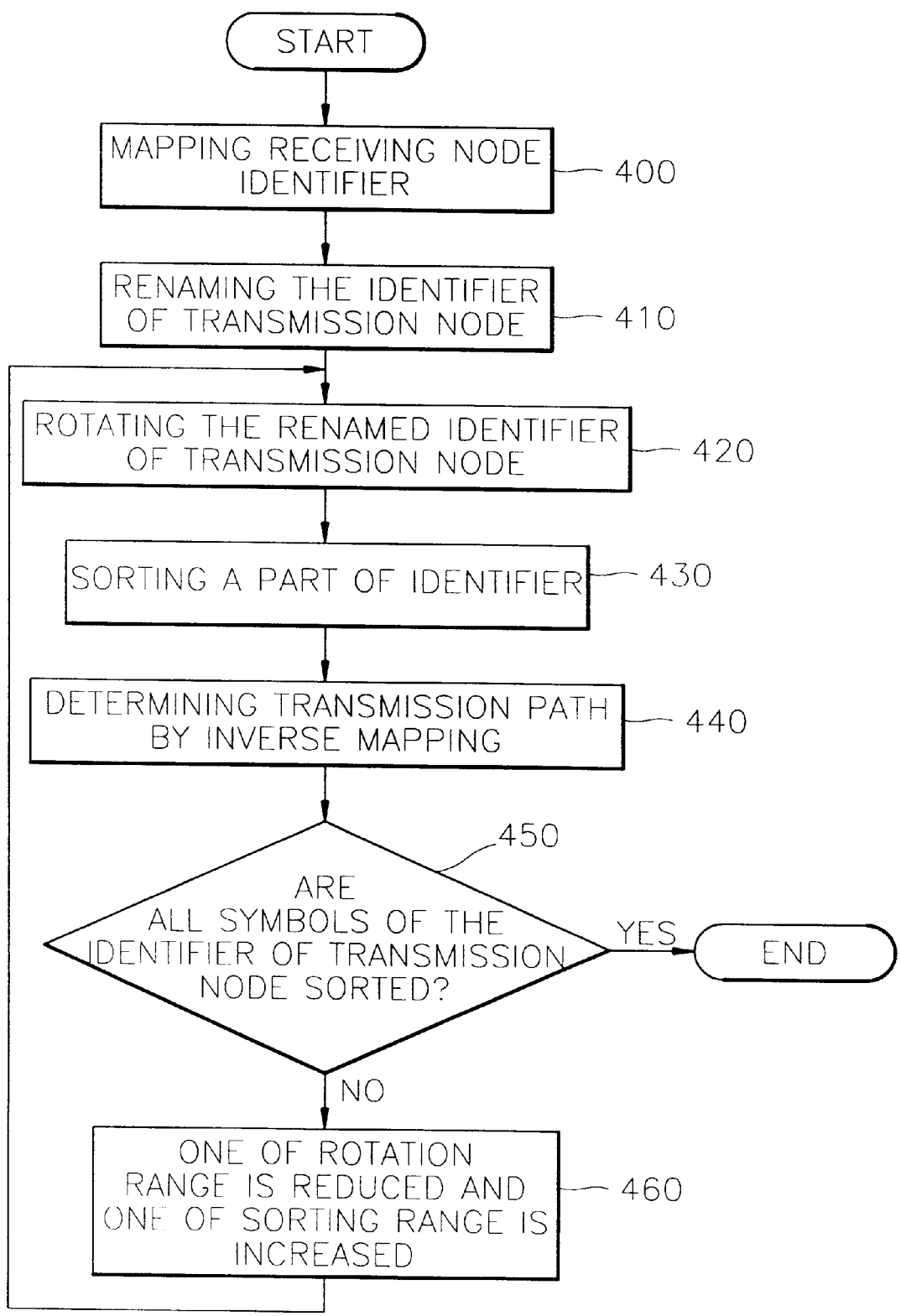
FIG. 4 is a flowchart of the step of setting a transmission path of an indirect rotator graph network, in accordance with the principles of the present invention.

Refer now to FIG. 4, which is a flowchart of the step of setting a transmission path of an indirect rotator graph network, in accordance with the principles of the present invention. FIG. 4 shows the step of setting a transmission path of an indirect n-dimensional rotator graph network.

A discussion of FIG. 4 follows, under the presumption that the indirect rotator graph network (IRGN) is four-dimensional. Also, it shall be presumed that the transmission node identifier is BCDA and that the receiving node identifier is CABD. The indirect rotator graph network is four-dimensional, which indicates that n is equal to four. At step 400, symbols composing the identifier of the receiving node are mapped to n new symbols having code values of ascending order. At this time, when the new symbols are 1234, 'C' is mapped to 1, 'A' is mapped to 2, 'B' is mapped to 3, and 'D' is mapped to 4, respectively. Thus, in the mapping, C corresponds to 1, A corresponds to 2, B corresponds to 3, and D corresponds to 4. At step 410, the symbols composing the identifier of the transmission node are renamed by mapping in the same manner as the receiving node identifier. That is, BCDA is mapped to '3142'.

At step 420, all of the first (n−1) symbols are rotated to the left from the renamed transmission node identifier. In other words, the leftmost 3 symbols are shifted left. Thus 3142 becomes 1432. Accordingly, three symbols are rotated to the left to be '1432'. At step 430, the last two symbols of the rotated transmission node identifier are arranged in an ascending order. In other words, the 2 rightmost symbols are arranged in ascending order. The '32' of the '1432' is sorted in the increasing order to be '1423'.

At step 440, new symbols composing the sorted transmission node identifier are mapped reversely to the step 400 to determine a transmission path. Using the aforementioned mapping, character 1 of the '1423' is reverse mapped to 'C', 4 is reverse mapped to 'D', 2 is reverse mapped to 'A', and 3 is reverse mapped to 'B', respectively. Accordingly, a later path is CDAB.

At step 450, it is checked whether all new symbols composing the transmission node identifier are arranged in the ascending order. If all new symbols composing the transmission node identifier are arranged in the ascending order, the process ends. However, if all new symbols composing the transmission node identifier are not arranged in the ascending order, step 460 is performed. At step 460, the number of symbols for rotating is reduced by 1, and the number of arranged symbols is increased by 1, and then steps 420 to 450 are repeated. Thus, the 2 leftmost symbols of 1423 are rotated left to arrive at 4123. Then the 3 rightmost symbols of 4123 are arranged in ascending order to arrive at 4123. Accordingly, '4123' is obtained by rotating all of two initial characters to the left and by sorting the last three characters. Accordingly, a later path is DCAB. Next the first character of the '4123' is rotated to the left and the last four characters are sorted to arrive at 1234, which corresponds to a final target CABD. In other words, the one leftmost symbol of 4123 is rotated left to arrive at 4123. Then the 4 rightmost symbols of 4123 are arranged in ascending order to arrive at 1234. Using the aforementioned mapping, symbol 1 of 1234 is reverse mapped to C, 2 is reverse mapped to A, 3 is reverse mapped to B, and 4 is reverse mapped to D, respectively. Accordingly, a later path is CABD. Thus, the transmission path is (BCDA)→(CDAB) →(DCAB)→(CABD).

The indirect rotator graph network (IRGN) requires a control tag for selecting one of n generators $\{g_1, g_2, \ldots, g_n\}$. A $\log_2 n$ bit is required for selecting each generator, so that the control tag is $(n-1)\log_2 n$ bits long. However, even when the number of the transmission links for connecting two nodes is less than n, the indirect rotator graph network (IRGN) requires n switch stages. Accordingly, the $g_1$ is required to the rest portion of the transmission path. At this time, when the initial tag sequence is not changed, the $g_1$ may be added to any position of the tag.

In the $\log_2 n$ bit, n is generally selected from the exponential values of 2, for example, 2, 4, 8, 16, and so forth. Thus, the $\log_2 n$ is the number of bits to select one of n nodes. The n nodes should be selected from steps 2 through n. In other words, the n nodes should be selected from (n−1) steps. Since n nodes should be selected from (n−1) steps, $(n-1)\log_2 n$ bits are needed as a whole.

Now presume that the control tag is $g_3 g_4$ for connecting two nodes of an indirect four-dimensional rotator graph network, in accordance with the principles of the present invention. At this time, the dimension number of the indirect rotator graph network (IRGN) is 4, and a three symbol control tag is required. Therefore, one $g_1$ is added to an initial control tag, to thereby compose the control tag. The $g_1 g_3 g_4$, $g_3 g_4 g_1$ and $g_3 g_4 g_1$ are appropriate control tags.

When the number of nodes is equal in indirect method networks, a network according to the present invention, may have the transmission step shorter than other networks. Therefore, a tag required for routing is reduced, to thereby increase a message transmission efficiency rate. Here, the indirect star graph network (ISGN) and the indirect rotator graph network (IRGN) are compared according to numbers of necessary steps and necessary control tag bit.

|  | ISGN | IRGN |
| --- | --- | --- |
| Number of steps | $[3(n-1)/2] + 1$ | n |
| Number of middle steps | $[3(n-1)/2] - 1$ | n − 2 |
| Number of bit of control tag | $[3(n-1)/2] \cdot [\log_2 n]$ | $(n-1) \cdot [\log_2 n]$ |

The foregoing paragraphs describe the details of the present invention which is a communications apparatus enabling data transfer among n! nodes in a multiprocessor system. Let us suppose that n is equal to 3 in one embodiment. Since 3! is equal to 6, the following statements can be made relating to this embodiment. The communications apparatus includes a plurality of processor units and 6 network nodes coupling those processor units. The communications apparatus also includes 6 input ports connected to the 6 network nodes. In addition, the communications apparatus includes 6 output ports connected to the 6 network nodes. The apparatus has a first stage switch unit which includes 6 demultiplexers. The 6 demultiplexers are coupled with the aforementioned 6 input ports. The communications apparatus also has a last stage switch unit which includes 6 multiplexers. The 6 multiplexers are coupled with the aforementioned 6 output ports. The apparatus can also have a plurality of intermediate stage switch units disposed between the aforementioned first stage switch unit and the last stage switch unit. Each one of the intermediate stage switch units includes 6 crossbar switchers in each intermediate stage switch unit. Each one of these 6 crossbar switchers is known as a 3×3 crossbar switcher. In other words, each one of the intermediate stage switch units includes 6 3×3 crossbar switchers. Thus, the communications apparatus also has 3 output generator units included in each one of the 6 3×3 crossbar switchers. The communications apparatus also has 3 output generator units included in each one of the 6 demultiplexers. Also, demultiplexers in the first stage switch unit include output generator units. And the crossbar switchers in the intermediate stage switch units include output generator units.

Thus, in the aforementioned embodiment of the present invention, the output generator units included in the demultiplexers of the first stage switch unit will be connected to a crossbar switches (in an intermediate stage switch unit) when there is at least one intermediate stage switch unit. Otherwise, when there are no intermediate stage switch units, the output generator units included in the demultiplexers of the first stage switch unit will be connected to multiplexers (in the last stage switch unit). The output generator units included in the crossbar switchers of the intermediate stage switch units will be connected to crossbar switches (in a subsequent intermediate stage switch unit) when there is at least one more intermediate stage switch unit prior to the last stage switch unit. Otherwise, when there are no more intermediate stage switch units, the output generator units included in the crossbar switchers of the intermediate stage switch units will be connected to multiplexers (in the last stage switch unit). Therefore, in accordance with the above information, when a primary 3×3 crossbar switcher includes a particular output generator unit, the primary 3×3 crossbar switcher can be said to be the parent of the particular output generator unit. Additionally, an intermediate stage switch unit is considered to be a later stage than the first stage switch unit. The last stage switch unit is considered to be a later stage than any intermediate stage switch unit. And the last stage switch unit is considered to be a later stage than the first stage switch unit.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A communication apparatus enabling data transfer among n! nodes in a multiprocessor system, comprising:

a plurality of processor units;

n! network nodes coupling said plurality of processor units, wherein said n is a positive whole integer, said n! network nodes forming an n-dimensional network configuration enabling data transfers among said plurality of processor units along a path connecting a plurality of transmission nodes selected from among said n! network nodes, each respective one of said n! network nodes having a respective unique network node label selected from n! unique network node labels;

n! input ports being connected to said n! network nodes;

n! output ports being connected to said n! network nodes;

a first stage switch unit including n! demultiplexer units being coupled with said n! input ports, and said first stage switch unit corresponding to a first stage;

a last stage switch unit including n! multiplexer units being coupled with said n! output ports, and said last stage switch unit corresponding to a last stage after said first stage;

a plurality of intermediate stage switch units each including n! n*n crossbar switchers and being disposed between said first and last stage switch unit, said plurality of intermediate stage switch units corresponding to second stage through (n−1)th stage switch units, said plurality of intermediate stage switch units corresponding to a plurality of intermediate stages later than said first stage, wherein a first intermediate stage is later than said first stage and a second intermediate stage is later than said first intermediate stage, said first and second intermediate stages being included in said plurality of intermediate stages; and a plurality of n output generator units being included within each one of said n! n*n crossbar switchers and being included within each one of said n! demultiplexer units, wherein each one unit of said plurality of n output generator units is coupled with one selected from among said n! n*n crossbar switchers and said n! multiplexer units in a later stage.

2. The apparatus of claim 1, wherein each one of said n! unique network node labels includes a plurality of n symbols.

3. The apparatus of claim 2, wherein each respective one unit of said n! demultiplexer units couples with a respective one of said n! network nodes and corresponds to the unique network node label of the respective one network node.

4. The apparatus of claim 3, wherein each respective one unit of said n! multiplexer units couples with a respective one of said n! network nodes and corresponds to the unique network node label of the respective one network node.

5. The apparatus of claim 4, wherein each respective one unit of said n! n*n crossbar switchers couples with a respective one of said n! network nodes and corresponds to the unique network node label of the respective one network node.

6. The apparatus of claim 5, wherein each respective one of said plurality of n output generator units is included within one unit selected from among a respective parent crossbar switcher chosen from said crossbar switchers and a respective parent demultiplexer unit chosen from said n! demultiplexer units.

7. The apparatus of claim 6, wherein each respective one unit of said plurality of n output generator units couples with one unit in a later stage selected from among a primary crossbar switcher chosen from said crossbar switchers and a primary multiplexer unit chosen from said n! multiplexer units, said primary crossbar switcher having a unique network node label corresponding to the unique network node label of the respective parent crossbar switcher of the respective output generator unit, and said primary multiplexer unit having a unique network node label corresponding to the unique network node label of the respective parent demultiplexer unit of the respective output generator unit.

8. The apparatus of claim 6, wherein an i-th generator unit selected from among said plurality of n output generator units couples with one unit in a later stage selected from among a secondary crossbar switcher chosen from said crossbar switchers and a secondary multiplexer unit chosen from said n! multiplexer units, and said secondary crossbar switcher having a unique network s node label corresponding to the unique network node label of the respective parent crossbar switcher of the i-th output generator unit when said unique network node label of the respective parent crossbar switcher has a leftmost plurality of n−i+2 symbols shifted to the left, and said secondary multiplexer unit having a unique network node label corresponding to the unique network node label of the respective parent multiplexer unit of the i-th output generator unit when said unique network node label of the respective parent multiplexer unit has a leftmost plurality of n−i+2 symbols shifted to the left, wherein said i corresponds to a positive whole integer.

9. A method of setting a data transfer path in a communication apparatus, comprising the steps of:

identifying a transmitting node selected from among a plurality of n! network nodes in a communication apparatus, wherein said n is a positive whole integer;

said plurality of n! network nodes coupling a plurality of processor units and forming an n-dimensional network configuration enabling data transfers among said plurality of processor units along a data transfer path coupling said transmitting node with a receiving node selected from among said plurality of n! network nodes, each respective node of said plurality of n! network nodes having a respective node label selected from a plurality of n! node labels, each one of said plurality of n! node labels having a plurality of n symbols;

identifying a transmitting node label selected from among said plurality of n! node labels, said transmitting node label corresponding to said transmitting node, said transmitting node label having a first transmitting symbol located at a leftmost position of said transmitting node label, a last transmitting symbol located at a rightmost position of said transmitting node label and corresponding to an nth transmitting symbol, and an (n−1)th transmitting symbol adjacent to said nth transmitting symbol and located at a left side of said nth transmitting symbol;

identifying said receiving node and identifying a receiving node label selected from among said plurality of n! node labels, said receiving node label corresponding to said receiving node, said receiving node label having a first receiving symbol located at a leftmost position of said receiving node label, a last receiving symbol located at a rightmost position of said receiving node label and corresponding to an nth receiving symbol, and an (n−1)th receiving symbol adjacent to said nth receiving symbol and located at a left side of said nth receiving symbol, said plurality of symbols included in said transmitting node label also being included in said receiving node label;

mapping a respective numerical value to each respective symbol of said plurality of n symbols of said receiving node label to form a receiving number having a plurality of n sequentially ascending numerical values, said first receiving symbol being mapped to a first receiving value, said nth receiving symbol being mapped to an nth receiving value larger than said first receiving value, said (n−1)th receiving symbol being mapped to an (n−1)th receiving value, said (n−1)th receiving value being less than said nth receiving value, forming a mapping relationship between said first receiving symbol and said first receiving value, between said nth receiving symbol and said nth receiving value, and between said (n−1)th receiving symbol and said (n−1)th receiving value;

utilizing said mapping relationship formed between said plurality of receiving symbols and said plurality of receiving values to assign a respective numerical value to each respective symbol of said plurality of n symbols of said transmitting node label to form a transmitting number having a plurality of n numerical transmitting values;

rotating in a left direction a leftmost (n−1) numerical transmitting values of said transmitting number to form a rotated transmitting number, said leftmost (n−1) numerical transmitting values corresponding to a total number of numerical transmitting values being rotated;

sorting in an ascending order two rightmost numerical transmitting values of said rotated transmitting number to form a sorted rotated transmitting number, said two rightmost numerical transmitting values corresponding to a total number of numerical transmitting values being sorted;

determining a data transfer path and utilizing said mapping relationship formed between said plurality of receiving symbols and said plurality of receiving values to perform a reverse-mapping and thereby assign a respective transmitting symbol to each respective numerical transmitting value of said plurality of n numerical transmitting values of said sorted rotated transmitting number; and sequentially repeating said rotating, sorting, and determining steps until all numerical transmitting values of said transmitting number are sorted in an ascending order from leftmost position to rightmost position of said transmitting number, such that one numerical transmitting value is removed from said total number of numerical transmitting values rotated in said rotating step prior to each performance of said rotating step, and such that one numerical transmitting value is added to said total number of numerical transmitting values sorted in said sorting step prior to each performance of said sorting step.

10. The method of claim 9, wherein said plurality of n symbols correspond to A, B, C, and D.

11. The method of claim 9, wherein said plurality of n sequentially ascending numerical values correspond to 1, 2, 3, and 4.

12. The method of claim 9, further comprising a step of transmitting data from said transmitting node to said receiving node.

13. An indirect n-dimensional rotator graph network having a transmission path of arbitrary nodes in a multiprocessor system including n! nodes having one of $r_1 r_2 \ldots r_n$, where $r_i$ indicates n different symbols, $1 \leq i \leq n$, as an identifier, comprising:

n! input ports connected to the nodes, respectively;

n! output ports connected to the nodes, respectively;

a first stage switch module connected to the nodes through the input ports, including n! demultiplexers each having an identifier equivalent to that of the connected node;

second through (n−1)th stage switch modules each having n! n×n crossbar switches each having one of n! $r_1 r_2 \ldots r_n$ as an identifier, respectively; and an nth stage switch module connected to the nodes through the output ports, including n! multiplexers each having an identifier equivalent to that of the connected node, wherein the switches or the demultiplexers composing switch modules of first to (n−1)th stages comprise n generators $g_1, g_2, \ldots, g_n$, the $g_1$ is connected to a switch or multiplexer of a later stage having an identifier identical to that of a demultiplexer or switch, to which the $g_1$ is included, and the $g_i (2 \leq 1 \leq n)$ is connected to a switch or multiplexer of a later stage having an identifier identical to the identifier obtained by rotating the first (n−i+2) symbols of the identifier of the switch or the demultiplexer to which the $g_i$ is included to the left.

14. A setting method of a transmission path in an indirect n-dimensional rotator graph network connected to n! nodes each having one of n! $r_1 r_2 \ldots r_n$ as an identifier, where $r_i$ indicates n symbols, $1 \leq i \leq n$, comprising:

a first step of mapping n new symbols having code values an ascending order to symbols composing the identifier of a receiving node one by one;

a second step of renaming each symbol composing an identifier of a transmission node to a new symbol mapped in the same manner as the step of mapping the receiving node identifier;

a third step of sequentially rotating the first (n−1) symbols of the renamed transmission node identifier to the left;

a fourth step of sorting two last symbols of the rotated transmission node identifier in an ascending order;

a fifth step of determining a transmission path by mapping the new symbols composing the sorted transmission node symbol in the manner inverse to that of the first step; and a sixth step of repeating the third to fifth steps by reducing one of the number the symbols rotated in the third step, and increasing one of the number the symbols sorted in the fourth step until all new symbols composing the transmission node are sorted in the ascending order.

* * * * *